March 10, 1936.　　　F. E. RICE　　　2,033,785

FAUCET

Filed July 10, 1933

INVENTOR
Frank E. Rice

BY

ATTORNEYS

Patented Mar. 10, 1936

2,033,785

UNITED STATES PATENT OFFICE 2,033,785

FAUCET

Frank E. Rice, Detroit, Mich.

Application July 10, 1933, Serial No. 679,707

2 Claims. (Cl. 251—42)

The present invention pertains to a novel faucet, and more particularly to a dispensing faucet adapted to be mounted on the discharge end of a pipe line that is connected to means for supplying liquid under pressure, for the purpose of regulating or controlling the flow of the liquid.

The primary object of the present invention is to provide a faucet wherein the movable valve member may be easily removed for the purpose of removing and replacing the valve face without disturbing the manual mechanism by means of which the valve member may be moved. In this connection the faucet includes a body wherein a slidable valve plug is provided with a rack that is engaged by a segment gear which is manually operated to move the valve plug into, or out of, engagement with a valve seat, the assembly being such that the valve plug may be removed but the plug operating means within the valve body is permanently enclosed therein to avoid possibility of disorder resulting from inexperienced persons tampering therewith.

Another object of the present invention is to design a faucet wherein a fluid passing through the same is not required to flow around sharp angles, and to thus provide a faucet suitable for dispensing beverages such as beer.

With the above and other ends in view the invention consists in matters hereinafter set forth and more particularly pointed out in the appended claims, reference being had to the accompanying drawing, in which—

Like characters of reference are employed throughout to designate corresponding parts.

Figure 2:
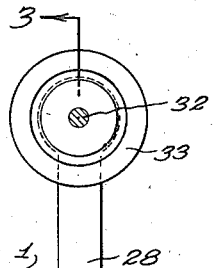
Fig. 2 is a vertical cross section.
Figure 2:
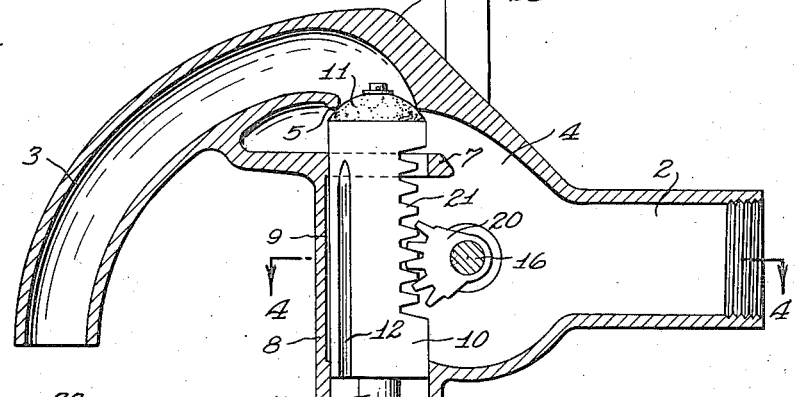
Figure 3:
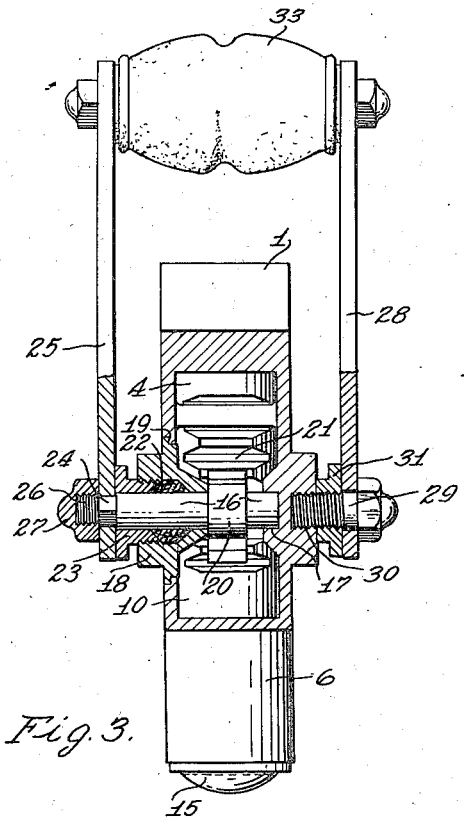
Fig. 3 is a cross section taken on the line 3—3 of Fig. 2.

In the drawing the numeral 1 designates a hollow faucet body formed with an inlet 2 and a discharge passage 3. The body 1 is formed with a chamber 4 in constant communication with the inlet 2 and communicating with the discharge passage 3 through a restricted port forming a valve seat 5. With reference to Fig. 2 it will be noted that the arrangement of the inlet 2, chamber 4, valve seat 5, and discharge passage 3 is such that a fluid entering the inlet and flowing through the above recited parts is not, at any stage of its passage, required to turn a sharp angle.

Figure 4:
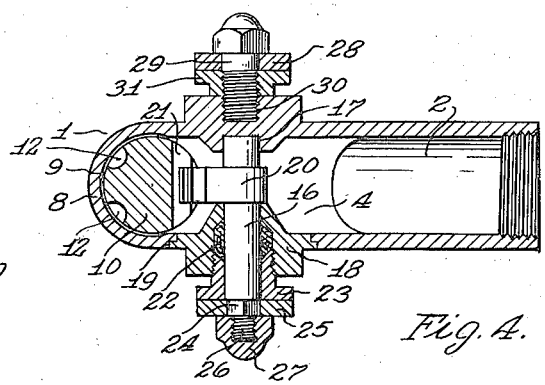
Fig. 4 is a cross section taken on the line 4—4 of Fig. 2.

With its axis coaxial with the vauve seat 5 is provided a tubular projection 6. Coaxial with the projection 6 is provided a bearing 7, the latter being disposed within the chamber 4 between the valve seat 5 and the tubular projection 6. A portion of the faucet body wall which is integral with the tubular projection 6, and which is designated by the numeral 8 is relieved or recessed as at 9. The wall portion 8 is semicircular in cross section as clearly illustrated in Fig. 4. The axis of the semi-circular wall 8 is concentric with the axes of both the tubular projection 6 and the bearing 7 and the relief 9 is provided by forming the wall 8 with a radius of greater length than the radii of the projection 6 and bearing 7.

A valve plug 10, of circular cross section, has its upper end slidably received in the bearing 7, and its lower end slidably received in the tubular projection 6. On the upper end of the valve plug is detachably secured a valve face member 11. The valve plug 10 is fluted, or provided with grooves 12 which, when the plug is assembled in the body 1, register or communicate with the relieved portion 9. The lower ends of the grooves 12 open through the lower end face of the valve plug and fluid communication between the chamber 4 and the tubular projection 6 beneath the valve plug is provided by means of the relieved portion 9 and the grooves 12. The lower end of the valve plug is provided with a projecting portion 13 which is adapted to engage a limiting member 14 on a plug 15 which is screwthreaded into the lower end of the tubular projection 6.

A shaft 16 has one end received in a shallow bore 17 and its other end supported in a bearing disk 18 which is sweated, or otherwise permanently secured, in an opening 19 in a wall of the body 1. On the shaft 16 is formed or secured a segment gear 20 which meshes with rack teeth 21 formed on the valve plug 10.

Packing 22 is received in the bearing disk 18 and is secured in place by a threaded plug 23 which loosely surrounds the shaft 16. The outer end of the shaft 16 which projects outwardly from the plug 23 is provided with a squared portion 24 upon which is non-rotatably mounted a lever arm 25. A screw threaded portion 26 on the outer extremity of the shaft 16 receives a nut 27 that secures the lever arm 25 on the squared portion 24.

On the opposite side of the valve body 1 as compared with the side through which the shaft 16 extends is pivotally supported a similar lever arm 28. The pivotal support for the lever arm 28 comprises a screw-threaded pin 29 which is received in a screw-threaded bore 30, a lock nut 31 being provided to secure the pin in place. The outer extremities of the lever arms 25 and 28 are joined by a rod 32 upon which is sleeved a handle member 33.

Figure 1:
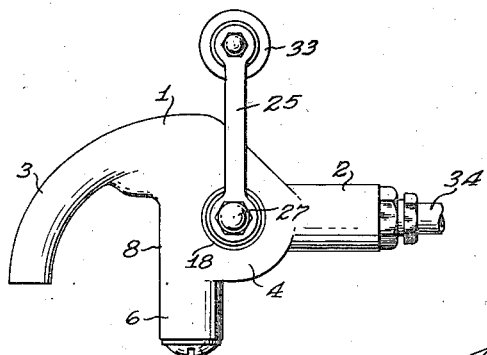
Figure 1 is a side elevation.

In Fig. 1 there is shown a pipe line 34 connected to the inlet 2 of the body 1 and it will be understood that this pipe line is adapted to be connected at its other end, which is broken away, to means for supplying liquid under pressure.

In operation, with the parts in the position shown in Fig. 2 fluid under pressure from the pipe line 34 through the inlet 2 has filled the chamber 4 and has entered the lower portion of the tubular projection 6 through the relieved part 9 and the grooves 12. The pressure of the fluid therefore tends to force the valve plug upwardly and thus insures sealing contact between the valve face 11 and the valve seat 5. It will be assumed that manual pressure is placed on the handle member 33. As a result of manual pressure the lever arms 25 and 28 are caused to pivot. Pivotal movement of the lever arm 25 causes rotative movement of the shaft 16 and gear segment 20, and the latter causes lengthwise movement of the valve plug 10 so that the valve face 11 is moved out of contact with the valve seat 5. At this time fluid entering the valve body 1 through the inlet 2 to the valve chamber 4 flows through the valve seat 5 to the discharge passage 3.

The limiting stop 14 defines the length of movement of the valve plug 10 away from the seat 5 and after the device has been in use over a period of time sufficient to cause wearing away of the valve face 11 the latter may be replaced by simply removing the plug 15 which permits the valve plug to be bodily removed from the body 1. If the packing 22 needs to be replaced the same may be accomplished by removing the nut 27, lever arm 25 and threaded plug 23. It will be noted that neither operation necessitates removal of the shaft 16 and accordingly the arrangement is such that the bearing disk 18 that supports and retains the shaft within the body 1 may be permanently sweated into the opening 19.

Although a specific embodiment of the present invention has been illustrated and described it is to be understood that various changes may be made within the scope of the appended claims without departing from the spirit of the invention, and such changes are contemplated.

What I claim is:—

1. A faucet comprising a hollow body formed with an inlet and an outlet passage, a valve seat between said inlet and said outlet passage, a tubular projection formed on said body coaxial with said valve seat, a bearing in said body coaxial with said valve seat and between the latter and said tubular projection, a valve plug slidably received in said bearing and extending into said tubular projection, said body having a relieved portion between said bearing and said tubular projection, said valve plug having grooves communicating with said relieved portion and said tubular projection, removable means for closing said tubular projection, a toothed segment within said body, rack teeth formed on said valve plug and engaged by said toothed segment, and manual means for rotatively moving said segment.

2. A faucet comprising a hollow body formed with an inlet and an outlet passage, a valve seat between said inlet and said outlet passages, a tubular part formed on said body coaxial with said valve seat, a valve plug having one end reciprocally received in said tubular part, a recess formed in the inner surface of a wall of said body and providing fluid communication on all sides of said valve plug with said inlet passage, said valve plug having grooves formed therein communicating with said recess and with one end opening through the end of the valve plug which extends into said tubular part, rack teeth on said valve plug, a toothed segment having axially extending stub shafts, a closed end bearing formed in one of the walls of said valve body and rotatably receiving one of said stub shafts, an opening formed in the other wall of said valve body through which the other stub shaft extends, a bearing member received in said opening and rotatably supporting said other stub shaft, said bearing member being integrally united with the side wall of the body to prevent its removal from said opening, and a handle secured to the end of said other stub shaft whereby manual pressure may be applied to said stub shaft to rotate said toothed segment.

FRANK E. RICE.